(12) United States Patent  
Grantz et al.

(10) Patent No.: US 7,056,026 B2  
(45) Date of Patent: Jun. 6, 2006

(54) CAPILLARY SEAL WITH FILL POOL

(75) Inventors: Alan Lyndon Grantz, Aptos, CA (US); Norbert Steven Parsoneault, Scotts Valley, CA (US); Chris Michael Woldemar, Santa Cruz, CA (US); James Sidney Lee, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 275 days.

(21) Appl. No.: 10/686,437

(22) Filed: Oct. 14, 2003

(65) Prior Publication Data

US 2004/0195777 A1    Oct. 7, 2004

Related U.S. Application Data

(60) Provisional application No. 60/460,498, filed on Apr. 4, 2003.

(51) Int. Cl. *F16C 33/74* (2006.01)
(52) U.S. Cl. ........................ 384/119; 384/132
(58) Field of Classification Search ............... 384/100, 384/114, 119, 132

See application file for complete search history.

(56) References Cited

U.S. PATENT DOCUMENTS

| 5,658,080 A * | 8/1997 | Ichiyama ..................... 384/112 |
| 6,814,492 B1 * | 11/2004 | Beckers ....................... 384/119 |
| 6,939,046 B1 * | 9/2005 | Oelsch ........................ 384/100 |

* cited by examiner

*Primary Examiner*—Thomas R. Hannon  
(74) *Attorney, Agent, or Firm*—Wax Law Group (57) ABSTRACT

Improved capillary sealing is provided for withstanding shock events, vibration and evaporation, for use with fluid dynamic bearings. In an aspect, minimal axial space is occupied by a fluid reservoir and the sealing system and method withstands at least 1000 G shock events. A fluid reservoir having a capillary surface is formed between diverging walls. A fluid fill pool, separate from the fluid reservoir and having a steeper angle than the fluid reservoir, is positioned adjacent to a fluid fill hole. The fill pool, having a greater diverging angle than the fluid reservoir provides an unstable region for fluid to remain and any fluid is pulled by capillary force gradient to the fluid reservoir.

18 Claims, 5 Drawing Sheets

CAPILLARY SEAL WITH FILL POOL

CROSS REFERENCE TO RELATED APPLICATION

This application is based on a provisional application Ser. No. 60/460,498, filed Apr. 4, 2003, titled Radial Capillary Seal With Anti-Shock Venting, and assigned to the Assignee of this application and incorporated herein by reference.

FIELD OF THE INVENTION

The invention relates generally to spindle motors, and more particularly to fluid dynamic bearing capillary seals that withstand shock events and evaporation.

BACKGROUND OF THE INVENTION

Disc drive memory systems are widely utilized throughout the world today in traditional computing environments and more recently in additional environments. These systems are used by computers and more recently by devices including digital cameras, digital video recorders, laser printers, photo copiers, jukeboxes, video games and personal music players. Consequently, the demands on disc drive memory systems has intensified because of increased performance demands and due to new environments for usage. Disc drive memory systems store digital information that is recorded on concentric tracks of a magnetic disc medium. Several discs are rotatably mounted on a spindle, and the information, which can be stored in the form of magnetic transitions within the discs, is accessed using read/write heads or transducers. The read/write heads are located on a pivoting arm that moves radially over the surface of the disc. The discs are rotated at high speeds during operation using an electric motor located inside a hub or below the discs. Magnets on the hub interact with a stator to cause rotation of the hub relative to the shaft. One type of motor is known as an in-hub or in-spindle motor, which typically has a spindle mounted by means of a bearing system to a motor shaft disposed in the center of the hub. The bearings permit rotational movement between the shaft and the hub, while maintaining alignment of the spindle to the shaft. The read/write heads must be accurately aligned with the storage tracks on the disc to ensure the proper reading and writing of information.

Spindle motors have in the past used conventional ball bearings between the hub and the shaft. However, the demand for increased storage capacity and smaller disc drives has led to the read/write head being placed increasingly close to the disc surface. The close proximity requires that the disc rotate substantially in a single plane. A slight wobble or run-out in disc rotation can cause the disc to strike the read/write head, possibly damaging the disc drive and resulting in loss of data. Conventional ball bearings exhibit shortcomings in regard to these concerns. Imperfections in the raceways and ball bearing spheres result in vibrations. Also, resistance to mechanical shock and vibration is poor in the case of ball bearings, because of low damping. Vibrations and mechanical shock can result in misalignment between data tracks and the read/write transducer. These shortcomings limit the data track density and overall performance of the disc drive system. Because this rotational accuracy cannot be achieved using ball bearings, disc drives currently utilize a spindle motor having fluid dynamic bearings on the shaft and a thrust plate to support a hub and the disc for rotation. One alternative bearing design is a hydrodynamic bearing.

In a hydrodynamic bearing, a lubricating fluid such as gas or liquid or air provides a bearing surface between a fixed member and a rotating member of the disc drive. Hydrodynamic bearings eliminate mechanical contact vibration problems experienced by ball bearing systems. Further, hydrodynamic bearings can be scaled to smaller sizes whereas ball bearings have smallness limitations. Dynamic pressure-generating grooves formed on a surface of the fixed member or the rotating member generate a localized area of high pressure and provide a transport mechanism for fluid or air to more evenly distribute fluid pressure within the bearing and between the rotating surfaces, enabling the spindle to rotate with more accuracy. However, hydrodynamic bearings suffer from sensitivity to external loads or mechanical shock events. Fluid can in some cases be jarred out of the bearing by vibration or shock events. Further, bearing fluid is susceptible to evaporation over time. Further, bearing fluids can give off vaporous components that could diffuse into a disc chamber. This vapor can transport particles such as material abraded from bearings or other components. These particles can deposit on the read/write heads and the surfaces of the discs, causing damage to the discs and the read/write heads as they pass over the discs.

Proper sealing is critical in the case of hydrodynamic bearings, and efforts have been made to address these problems. A capillary seal is typically employed to ensure fluid is maintained within a bearing. Here, a fluid meniscus is formed between two walls and capillary attraction retains the fluid.

Further, there is a trend to reduce the axial height of the fluid dynamic bearing motor since smaller profile disc drives are desired. However, as motors become shorter in height, the spacing between bearing components decreases, minimizing the angular or rocking stiffness of the bearings. It is important to maximize the available axial height for the bearings to support the relative rotation of the shaft and sleeve. The axial height of the capillary seal is therefore minimized to maximize the available axial height for the bearings. However, in minimizing the capillary seal height, the reservoir volume is reduced.

Recent designs employ a radial capillary seal having diverging walls wherein the diverging walls form a fluid reservoir for fluid lost due to evaporation. The capillary seal, being radial, minimizes the axial height of the capillary seal. Further, in a reservoir having larger volume, lower viscosity oil may be used, lowering power loss due to viscous friction. However, with a larger reservoir having diverging walls, the capillary seal gap is widened and thus the oil retention capability is lowered. Moreover, although a radial capillary provides some shock resistance, its shock resistance is limited. Fluid can be dislodged from a reservoir by shock, which moves a portion of fluid under a fluid fill hole included as part of the capillary seal. The fluid can potentially splash out during an initial shock event or during a subsequent shock event. Tests show that recent radial capillary seal designs fail at about 500 Gs of shock, and fluid leaks through fill holes at about 500 Gs of shock.

Mobile applications require higher resilience to shock events than desktop or enterprise products. Laptop or portable computers can be subjected to large magnitudes of mechanical shock as a result of handling. It has become essential in the industry to require disc drives to be capable of withstanding substantial mechanical shock. What is needed is a capillary sealing system that is axially minimized to maximize the height available for bearings. Further, a capillary seal system with a fluid reservoir that can withstand greater than 500 Gs shock is needed.

SUMMARY OF THE INVENTION

Improved capillary sealing is provided that withstands operating mode and non-operating mode mechanical shock, vibration and evaporation for use with fluid dynamic bearings, which in turn may be incorporated into a spindle motor or the like. In an embodiment, the sealing system withstands at least 1000 G shock. Also provided is a capillary seal system that occupies minimal axial space so that the axial length of a bearing may be maximized, optimizing bearing stiffness and performance. Further provided is a capillary seal system that may be utilized with a variety of bearing designs, including conical bearing designs. Additionally, the capillary seal provides a fluid reservoir that has a larger volume than a conventional capillary seal so that proper fluid volume is maintained within a fluid dynamic bearing. Further, the fluid reservoir allows for usage of lower viscosity oil, lowering power loss.

Features of the invention are achieved in part by utilizing a shield extending from a shaft. A first capillary seal is formed between a narrow annulus between a rotating shaft and a stationary shield. A second capillary seal is formed by a fluid reservoir. The reservoir is formed by diverging walls of the shield and a sleeve, and a capillary seal is formed between the diverging walls. Also employed is a sleeve having a fluid fill pool substantially positioned adjacent to a fluid fill hole or air vent hole formed through the shield.

Strong fluid capillary force gradients surround the fluid fill pool, and weaker capillary force gradients exist in the fluid fill pool. A fluid meniscus forms an arch partially around the fluid fill pool. The fill pool, having a greater diverging angle than the reservoir provides an unstable region for fluid to remain. In the case of a shock event, fluid may become situated within the area of the fluid fill pool. Any fluid is pulled to the reservoir (a more stable region), directed away from the fill pool and consequently away from the fill/vent hole. The small fluid fill hole and an optional vent hole minimizes the surface area available for fluid leakage and evaporation. Should fluid arrive within the fluid fill pool after a shock event, it is promptly moved from the unstable region. In a subsequent shock event the fluid is not situated in line with the fluid fill/vent hole where it can be ejected through the hole.

Other features and advantages of this invention will be apparent to a person of skill in the art who studies the invention disclosure. Therefore, the scope of the invention will be better understood by reference to an example of an embodiment, given with respect to the following figures.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE INVENTION

Exemplary embodiments are described with reference to specific configurations. Those of ordinary skill in the art will appreciate that various changes and modifications can be made while remaining within the scope of the appended claims. Additionally, well-known elements, devices, components, methods and the like may not be set forth in detail in order to avoid obscuring the invention.

A system and method of capillary sealing that withstands at least 1000 G shock events, vibration and evaporation is described herein. It will be apparent that features of the discussion and claims may be utilized with disc drives, spindle motors, various fluid dynamic bearing designs including hydrodynamic and hydrostatic bearings, and other motors employing a stationary and a rotatable component.

Figure 1:
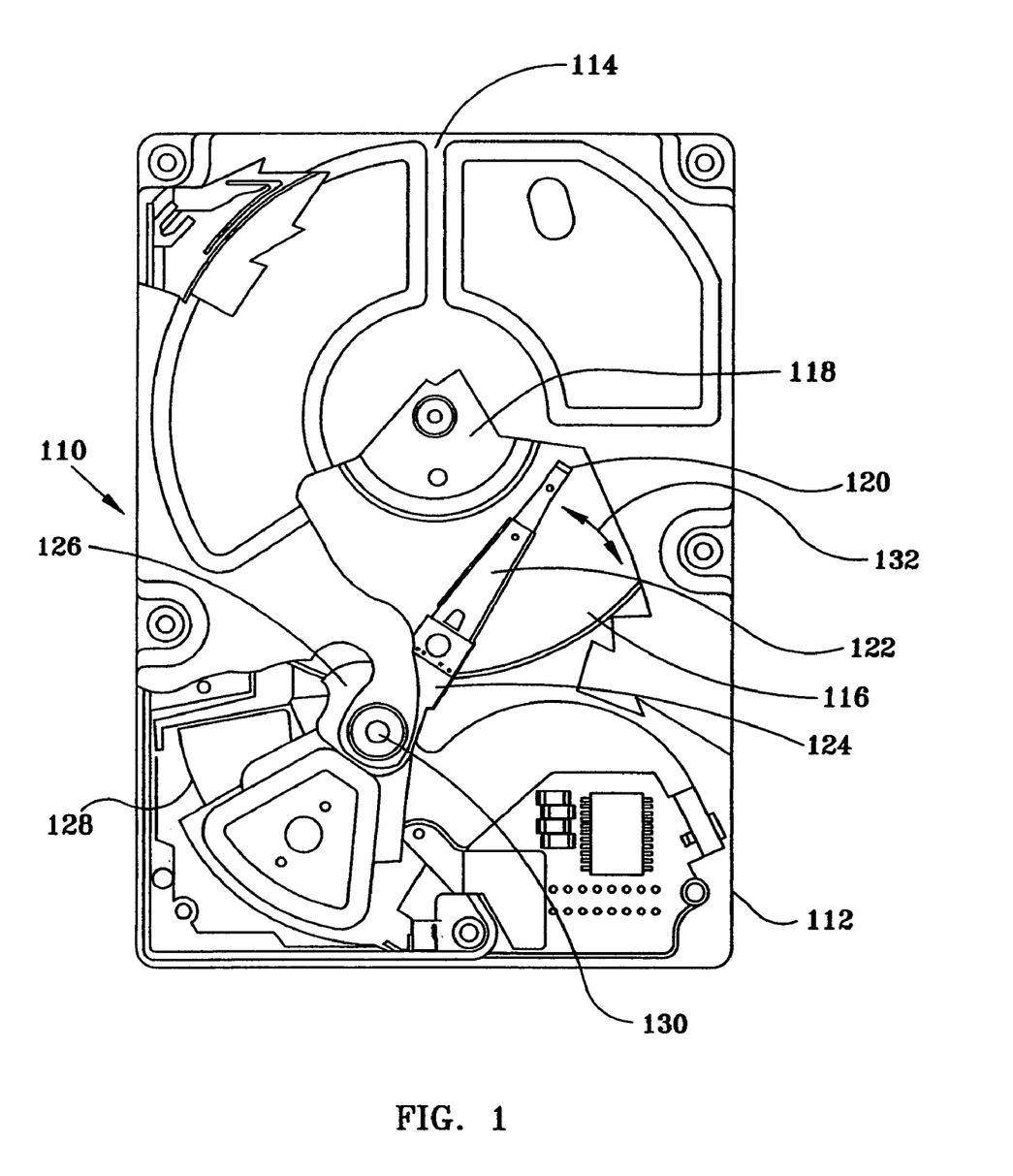
FIG. 1 is a top plain view of a disc drive data storage system in which the present invention is useful, in an embodiment.

Referring to the drawings wherein identical reference numerals denote the same elements throughout the various views, FIG. 1 illustrates a typical disc drive data storage device 110 in which the present invention is useful. Clearly, features of the discussion and claims are not limited to this particular design, which is shown only for purposes of the example. Disc drive 110 includes housing base 112 that is combined with cover 114 forming a sealed environment to protect the internal components from contamination by elements outside the sealed environment. Disc drive 110 further includes disc pack 116, which is mounted for rotation on a spindle motor (not shown) by disc clamp 118. Disc pack 116 includes a plurality of individual discs, which are mounted for co-rotation about a central axis. Each disc surface has an associated head 120 (read head and write head), which is mounted to disc drive 110 for communicating with the disc surface. In the example shown in FIG. 1, heads 120 are supported by flexures 122, which are in turn attached to head mounting arms 124 of actuator body 126. The actuator shown in FIG. 1 is a rotary moving coil actuator and includes a voice coil motor, shown generally at 128. Voice coil motor 128 rotates actuator body 126 with its attached heads 120 about pivot shaft 130 to position heads 120 over a desired data track along arcuate path 132. This allows heads 120 to read and write magnetically encoded information on the surfaces of discs 116 at selected locations.

Figure 2:
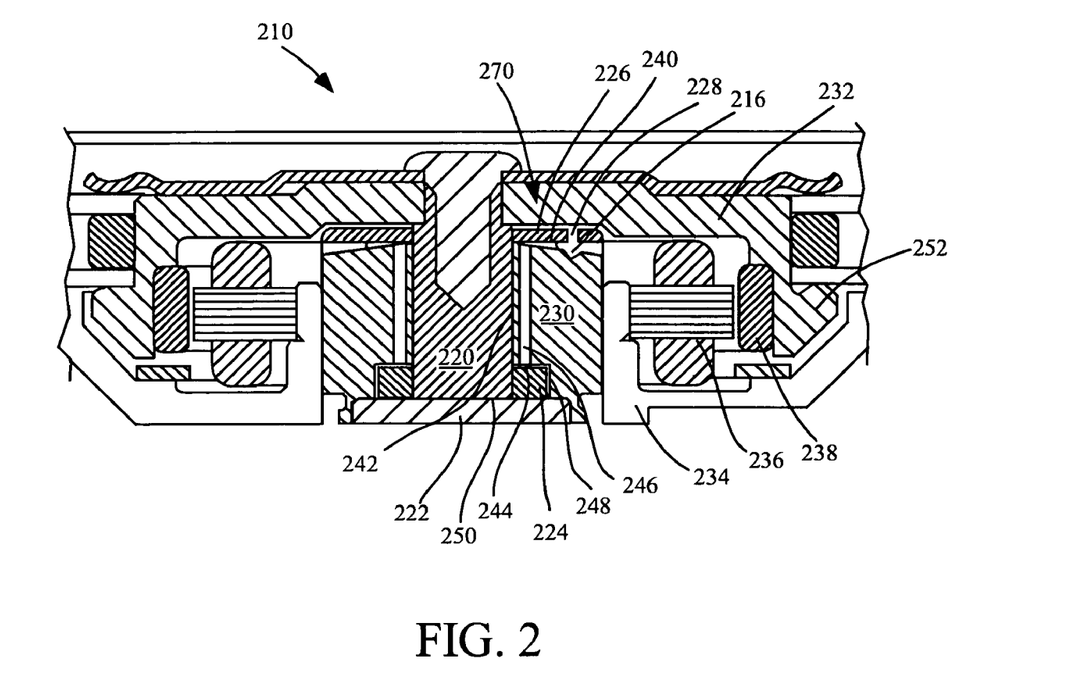
FIG. 2 is a sectional side view of a hydrodynamic bearing spindle motor used in a disc drive illustrating a capillary shield and reservoir, in which the present invention is useful.

FIG. 2 is a sectional side view of a hydrodynamic bearing spindle motor 210 used in disc drives 110 in which the present invention is useful. Again, clearly, the present invention is not limited to use with a hydrodynamic spindle motor design of a disc drive, which is shown only for purposes of the example. Typically, spindle motor 210 includes a stationary component and a relatively rotatable component. The spindle motor 210 is of a rotating shaft motor design. The stationary component includes sleeve 230 that is fixed and attached to base 234. The rotatable component shaft 220 is affixed to hub 232 having one or more magnets 238 attached to a periphery thereof. The magnets 238 interact with a stator winding 236 attached to the base 234 to cause the hub 232 and shaft 220 to rotate. Magnet 238 can be formed as a unitary, annular ring or can be formed of a plurality of individual magnets that are spaced about the periphery of hub 232. Magnet 238 is magnetized to form one or more magnetic poles.

The shaft 220 and thrust plate 224 fit into sleeve 230. Hub 232 includes a disc carrier member 252, which supports disc pack 116 (shown in FIG. 1) for rotation about sleeve 230. Disc pack 116 is held on disc carrier member 252 by disc clamp 118 (also shown in FIG. 1). Hub 232 is interconnected with shaft 220 through hydrodynamic bearing 242 for rotation about sleeve 230. A fluid, such as lubricating oil or a ferromagnetic fluid fills interfacial regions between shaft 220 and sleeve 230, thrust plate 224 and sleeve 230, thrust plate 224 and counterplate 222, shield 226 and shaft 220 and between shield 226 and sleeve 230.

The outer surface of shaft 220 and the adjacent bore of sleeve 230 together form hydrodynamic journal bearing 242. The bearing gap of journal bearing 242 is typically between 0.001 mm and 0.006 mm. Journal bearing 242 typically include a grooved surface provided either on the outer surface of shaft 220 or the inner bore surface of sleeve 230. In order to promote the flow of fluid over the bearing surfaces which are defined between the thrust plate 224 and the counterplate 222; between the thrust plate 224 and the sleeve 230; and between the shaft 220 and the sleeve 230, typically one of two opposing surfaces of each such assembly carries sections of pressure generating grooves (not shown), including asymmetric and symmetric grooves. The grooving pattern includes and is not limited to one of a herringbone pattern and a sinusoidal pattern. Asymmetric and symmetric grooves induce fluid flow in the interfacial region and generate a localized region of dynamic high pressure and radial stiffness. As shaft 220 rotates, pressure is built up in each of its grooved regions. In this way, shaft 220 easily supports hub 232 for constant high speed rotation.

The hub 232 is mounted to shaft 220 with which it rotates. On one end of shaft 220 is thrust plate 224. Thrust plate 224 can be an integral part of shaft 220, or can be a separate piece that is attached to shaft 220, for example, by a press fit. Further, thrust plate 224 is positioned adjacent to counterplate 222 at interface 250. Counterplate 222 is press fitted to or otherwise supported by sleeve 230. Counterplate 222 provides axial stability for the hydrodynamic bearing and positions sleeve 230 within spindle motor 210. Together, counterplate 222 and sleeve 230 seal an end of the hydrodynamic bearing, namely at interface 250.

In one design, at least one of thrust plate 224 and counterplate 222 include a series of alternating grooves and lands extending along interface 250 from an outer diameter of the thrust plate to the center of the surface of shaft 220. The plurality of grooves and lands together form a pattern, such as a spiral pattern. When the bearing surface is rotated the grooves and lands pump inward to create a pressure increase toward the center of the shaft. This pressure maintains the bearing surfaces apart under external loading. Further, any air in the bearing is driven in a direction opposite to a pressure increase, air being driven toward interface 248 and toward plenum 244, which has a larger gap and a lower pressure area as compared to the outer diameter of interface 250. Once air reaches plenum 244, fluid recirculation sweeps any air through recirculation passageway 246 to reservoir 240 where it can be released through fill/vent hole 228.

Radial capillary seal 270 is defined by shield 226 and a surface of sleeve 230, at the distal end of the shaft from thrust plate 224. Radial capillary seal 270 is used to maintain fluid in journal bearing 242, plenum 244, interface 248 and interface 250. Also shown between shield 226 and sleeve 230 is fill pool 216, which creates an unstable area for any fluid in fill pool 216, keeping fluid clear of fill hole 228, as further discussed in FIG. 3.

Figure 3:
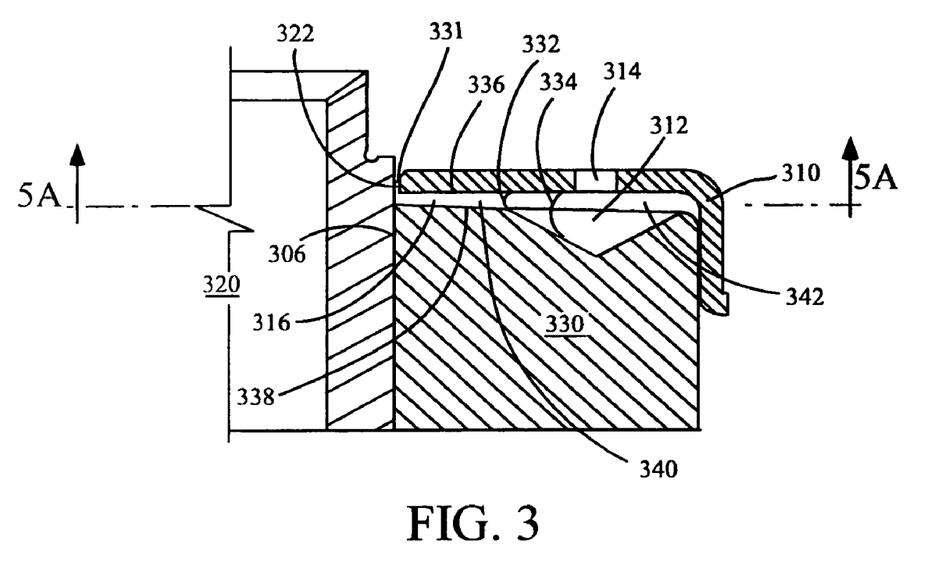
FIG. 3 is a sectional side view of a portion of a fluid dynamic bearing motor incorporating a capillary shield and fill pool, in an embodiment of the present invention.

Referring to FIG. 3, a portion of a fluid dynamic bearing is shown incorporating a radial capillary seal and a fluid fill pool, in an embodiment of the present invention.

Shield

The radial capillary seal includes shield 310 affixed to sleeve 330 (by laser welding, adhesive bonding or other method) at a position distal from journal bearing 306. Facing surfaces of shield 310 and sleeve 330 define channel 316. Channel 316 extends in a radial direction and terminates at the outer diameter of sleeve 330. In an alternative embodiment, channel 316 initially extends radially from shaft 320 and further extends generally axially at a position distal from shaft 320. In this alternative design, channel 316 is formed by facing surfaces of shield 310 and sleeve 330, and is further formed as (or extends into) a cavity within sleeve 330, at a more distal position from shaft 320. Minimal motor vertical height is dedicated to the radial capillary seal and channel 316, thus maximizing the available axial height for journal bearing 306 to support the relative rotation of shaft 320 and sleeve 330 and achieve resistance to angular motion.

As used herein, the terms "axially" or "axial direction" refers to a direction along a centerline axis length of the rotating shaft, and "radially" or "radial direction" refers to a direction perpendicular to the centerline length of the rotating shaft.

Annulus

Annulus 322 is defined by facing surfaces of shield 310 and shaft 320. Grooves may be defined on one of the two facing surfaces of shaft 320 and shield 310 so that relative rotation of the two surfaces cause a pumping of fluid toward journal bearing 306. In an embodiment, the radial width of annulus 322 is in the range of 0.015 mm to 0.03 mm. This small width provides a strong capillary retentive force and high shock resistance at first capillary 340 331. A carbon or diamond-like-carbon (DLC) coating can be utilized at annulus 322, either formed on shaft 320 or shield 310 to further protect these adjacent surfaces and to more accurately set the narrow annulus gap.

Annulus 322 is defined by facing surfaces of shield 310 and shaft 320. Grooves may be defined on one of the two facing surfaces of shaft 320 and shield 310 so that relative rotation of the two surfaces cause a pumping of fluid toward journal bearing 306. In an embodiment, the radial width of annulus 322 is in the range of 0.015 mm to 0.03 mm. This small width provides a strong capillary retentive force and high shock resistance at first capillary 331. A carbon or diamond-like-carbon (DLC) coating can be utilized at annulus 322, either formed on shaft 320 or shield 310 to further protect these adjacent surfaces and to more accurately set the narrow annulus gap.

In an embodiment, annulus 322 maintains a smaller radial width than the axial width of channel 316 at the location in which channel 316 converges proximal to shaft 320. Fluid is thereby directed to channel 316 rather than to annulus 322. The axial width of channel 316 at the location in which channel 316 converges proximal to shaft 320 is about 0.08 mm. The axial width of the channel distal from the rotatable component is about 0.1 mm.

Fill Hole

A fluid fill hole 314, which may also serve as an air vent hole, extends substantially axially through shield 310 to channel 316. Fill hole 314 is radially displaced from shaft 320 toward an outer end of channel 316. It is to be appreciated that more than one fluid fill hole may be employed. In fact, two separate holes, a fluid hole and air vent hole are useful since as fluid is being injected, displaced air can be expelled through a separate air vent hole.

In an embodiment, the fluid capacity in channel 316 is on the order of 1.5 to 6 microliters. A conventional capillary seal, being the type that extends axially from the end of a journal bearing, holds a volume on the order of 1 microliter or less. Thus, in an embodiment, the present invention can increase the reservoir volume by a factor of up to 6 over prior designs.

A reduction of fluid evaporation is achieved by the present invention over previous designs. By utilizing a small fill hole 314 and small annulus 322, a lower fluid evaporation rate than prior designs results. This combined with a large capacity channel 316, will provide either a significantly longer life for the same type of fluid or enable the use of lower viscosity oil.

Divergence Angles

In an embodiment, channel 316 is formed with at least one axially diverging surface. The facing surfaces axially diverge as the radial distance from shaft 320 increases. In an embodiment, the facing surfaces commence to diverge at the position closest to shaft 320 and diverge continuously along channel 316. It is to be appreciated that either the surface of sleeve 330 facing shield 310 (surface 338), the surface of shield 310 facing sleeve 330 (surface 336), or both facing surfaces 336 and 338 can be formed to diverge in an axial direction.

Fill Pool

A fill pool 312 is formed in sleeve 330. In an embodiment, fill pool 312 is positioned directly adjacent (or below) fill hole 314. The surfaces of fill pool 312 diverge from shield 310 at an angle greater than the adjacent facing diverging surfaces of shield 310 and sleeve 330. An unstable area is thereby created for any fluid in the fill pool. In an embodiment, the angle of divergence of the adjacent surfaces of shield 310 and sleeve 330 is about 2 degrees, and the angle of divergence of fill pool 312 from shield 310 is about 30 degrees.

Resistance to shock events is provided by the shielding properties of fill pool 312. Fill pool 312 effectively shields fill hole 314 by providing a higher resistance to fluid redistribution than second capillary 332. The stiffness (or resistance to flow) of a diverging seal is proportional to the gap and the angle of divergence. That is, angle of divergence affects fluid capillary strength. A steeper angle of divergence creates a stronger seal, since a stronger gradient is created pulling on fluid. Strong capillary force gradients surround fill hole 314 and a weaker capillary force gradient exists in other areas, resulting in shock induced fluid flow being directed away from fill hole 314. Further, fill pool 312 provides an unstable fluid area, resulting in fluid being quickly removed from this region in a shock event. In a subsequent shock event, fluid is not situated nearby fill hole 314 where it can be ejected.

Capillaries

Radial capillary seal 270 employs two capillary seals. The first capillary 331 is a narrow opening defined between shaft 320 and shield 310 within annulus 322. As discussed above, annulus 322 establishes a capillary that provides high shock resistance against fluid loss as well as a small surface area from which evaporation may occur. A second capillary 332 (or meniscus) is defined within channel 316, between facing surfaces of shield 310 and sleeve 330. As fluid volume expands within the motor, or entrained air expands, second capillary 332 accommodates the volume increase. In an embodiment, fluid reservoir 340 is formed on a first side of second capillary 332, and an air plenum 342 is formed on a second side of second capillary 332. Fill pool 312 having a steeper divergence angle than fluid reservoir 340 creates a force gradient to pull any fluid (individual fluid particles or fluid meniscus) from fill pool 312 to second capillary 332. A third fluid meniscus 334 can be formed within fill pool 312 during fluid filling through fill hole 314. Third fluid meniscus 334 can also be temporarily formed within fill pool 312 during a shock event. As described above, third fluid meniscus 334 is situated in an unstable fluid area within fluid pool 312 and the divergence angle of fill pool 312 creates a force gradient to pull a third fluid meniscus 334 from fill pool 312.

Figure 4:
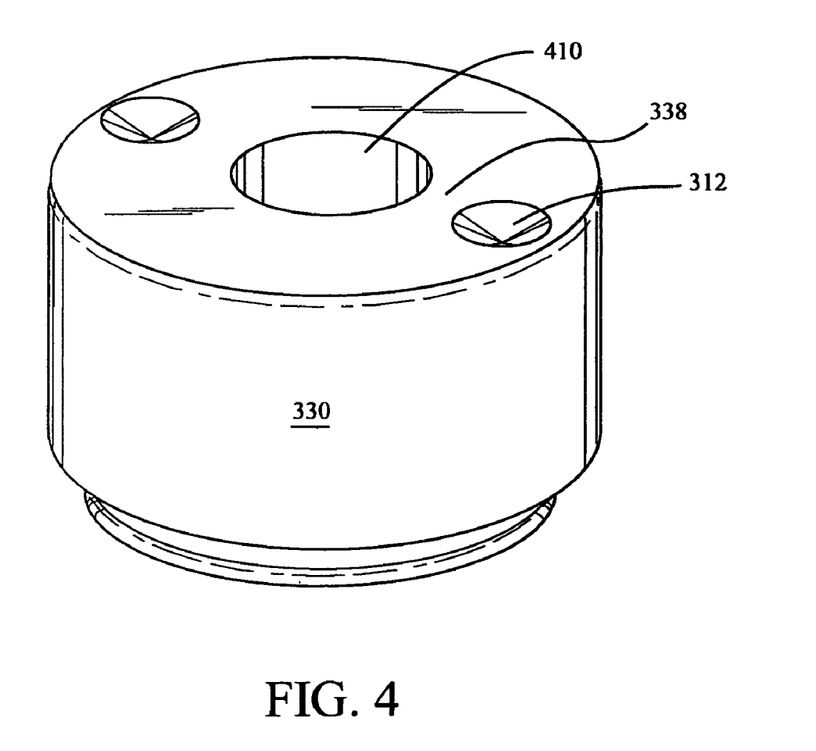
FIG. 4 is a perspective view of a sleeve incorporating a fill pool, in an embodiment of the present invention.

FIG. 4 shows a perspective view of a sleeve 330 defining a fill pool 312. Fill pool 312 is typically positioned adjacent to a fill hole. Sleeve 330 as shown here includes 2 fill pools; however, sleeve 330 would include one fill pool if one fill hole was employed. A bore 410 is also shown defined through sleeve 330 in which a rotatable shaft is supported for rotation relative to sleeve 330. It can be observed that fill pool 312 utilizes axial space without reducing journal bearing axial space, thus maximizing the available axial height for a journal bearing.

Figure 5A:
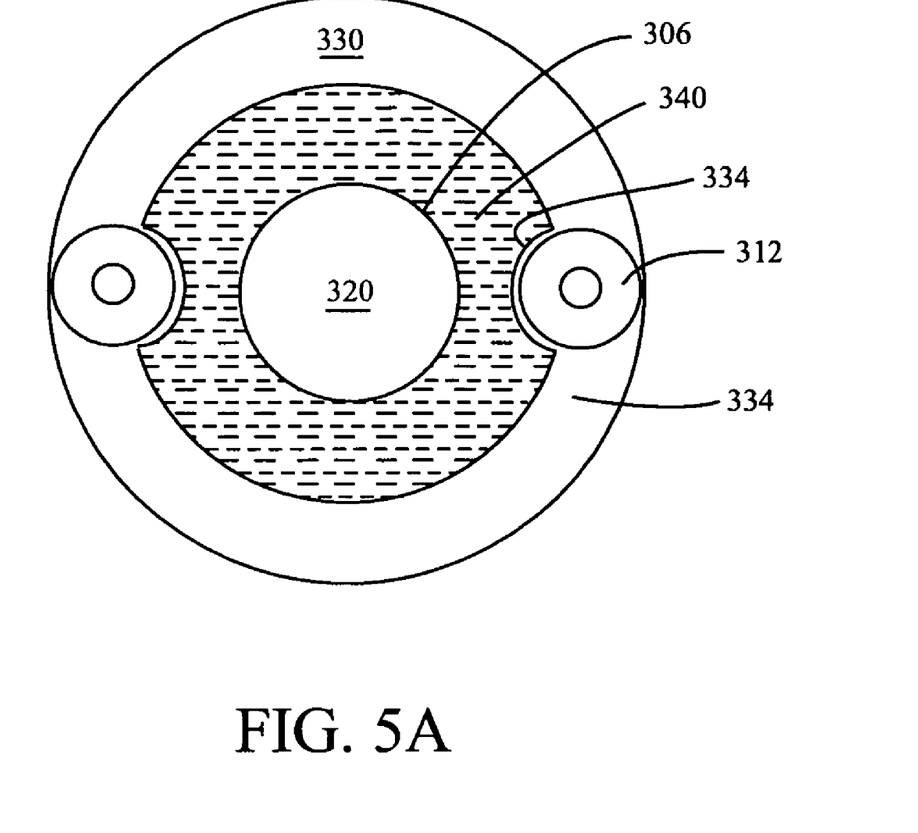
FIG. 5A is a diagrammatic sectional view of a portion of a fluid dynamic bearing motor showing a channel and a center shaft, taken along the 5A line of FIG. 3.

FIG. 5A shows a channel and a center shaft, taken along the line 5A of FIG. 3, illustrating the operation of capillary attraction. Fluid is drawn from fluid reservoir 340 toward journal bearing 306 by flow recirculation when shaft 320 rotates within sleeve 330. Second fluid meniscus 334 defines fluid reservoir 340 arched at least partially about a periphery of fill pool 312. An air plenum 334 is created outside fluid reservoir 340. The steeper divergence angle formed at the periphery of fill pool 312 creates a force gradient that ultimately retains any fluid within fluid reservoir 340 during and following a shock event. In an embodiment, fluid reservoir 340 is formed with a divergence gradient of 2 degrees and fill pool 312 is formed with a divergence angle of 30 degrees. Utilizing these angles of divergence, experimental tests conducted show channel 316 withstands shock events of at least 1000 G, fluid being retained within channel 316. Other divergence angles withstand shock events and are similarly useful to retain fluid within channel 316. Thus, an enlarged fluid reservoir with high fluid retention capacity is provided.

Figure 5B:
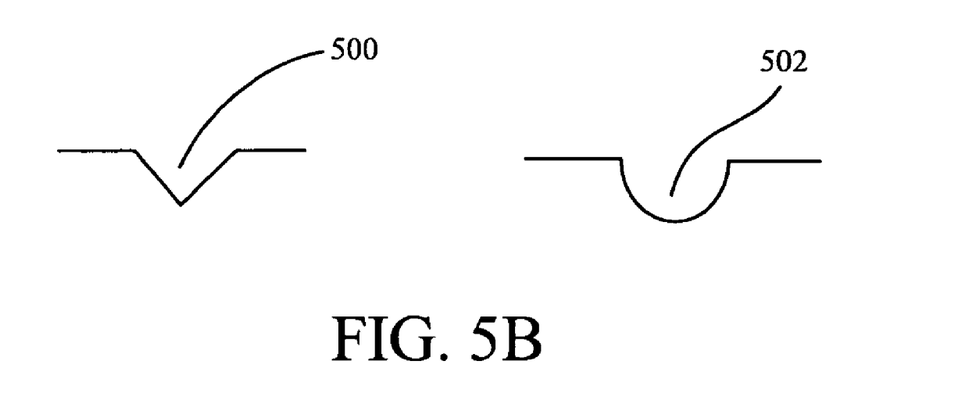
FIG. 5B is a diagrammatic sectional view of a fluid dynamic bearing motor showing shapes of alternative embodiments of a fill pool, taken along the 5A line of FIG. 3.

FIG. 5B shows the fluid dynamic bearing motor of FIG. 3, taken along the line 5A, illustrating alternative embodiment shapes that fill pool 312 may take on, including a conical shape 500 and a spherical shape 502. The shape of a fill pool and the angle of divergence of a fill pool from a fluid reservoir affect the stability of any fluid in a fill pool and affect the capillary force gradient acting on any fluid in a fill pool.

Figure 6:
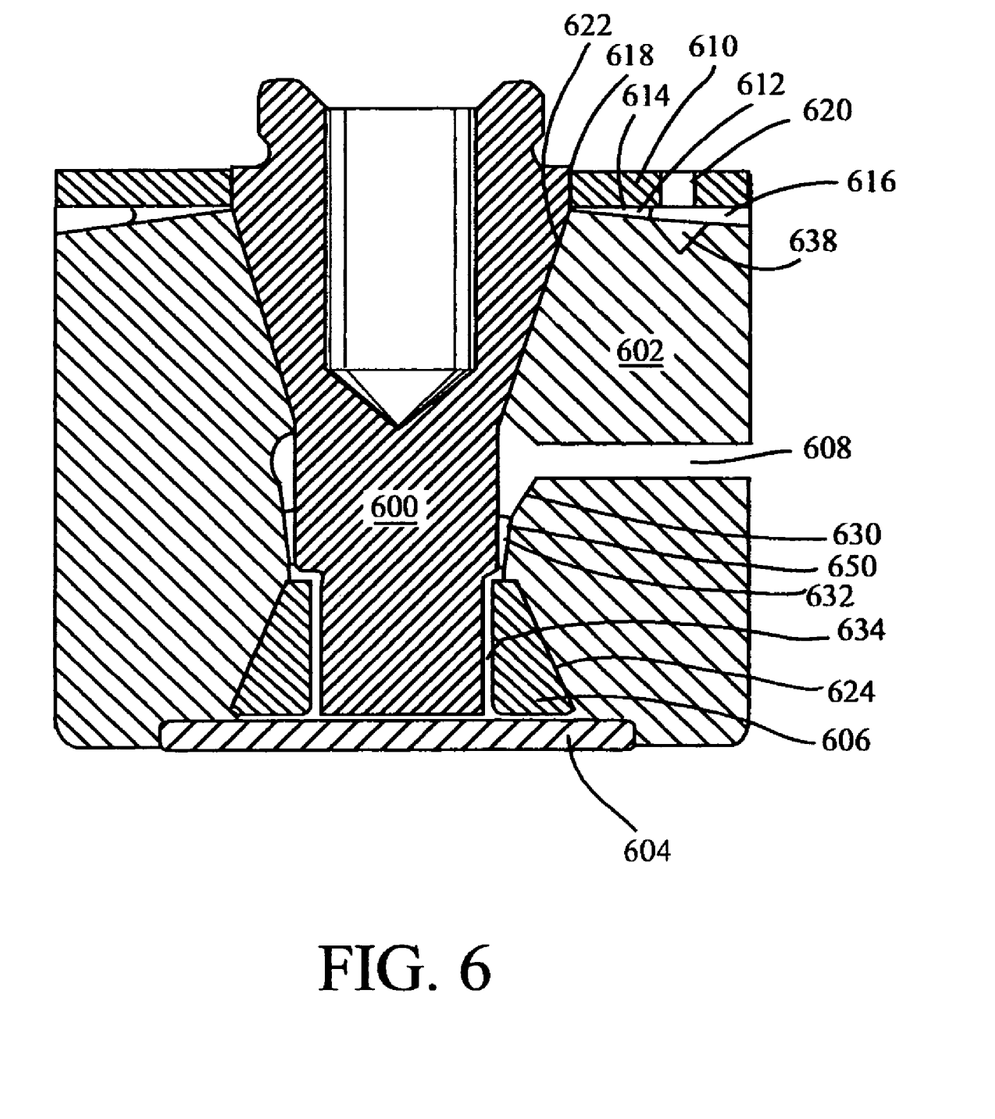
FIG. 6 is a sectional side view of a portion of a conical rotating shaft fluid dynamic bearing motor incorporating two separate capillary seals and fill pools, in an embodiment of the present invention.

In an alternative embodiment, the capillary seal of the present invention is utilized with a conical fluid dynamic bearing as shown in FIG. 6. Similar to the rotating shaft design of FIG. 2, the conical design shown in FIG. 6 includes a rotatable shaft 600, stationary sleeve 602, and stationary counterplate 604. A separation barrier between journal bearing 622 and conical bearing 624 is created by fill hole 608. Fill holes 620 and 608 provide fluid to separate bearings. The present invention provides, in an embodiment, two separate capillary seals and separate fill pools that communicate with these separate bearings.

Journal bearing 622 is filled with fluid through fill hole 620 and fluid is maintained by radially oriented capillary seal 612, similar to the journal bearing and capillary seal as shown in FIG. 3. Shield 610, affixed to sleeve 602, forms fluid reservoir 614, air plenum 616 and annulus 618. Fill pool 638 is formed with a steeper diverging angle as compared to fluid reservoir 614, creating an unstable area for fluid to remain, as discussed in above embodiments.

Conical bearing 624 includes a cone 606 and fluid in circulation path 634 to support shaft 600 for rotation. Fill hole 608 is positioned extending through sleeve 602 so that fluid reservoir 632 can be filled. In order for fluid to be maintained in conical bearing 624, an axially oriented capillary seal 650, including fluid reservoir 632 establishes a reservoir for replenishing fluid, and is positioned between a surface on shaft 600 and a tapered surface on the inner surface of sleeve 602. Fill pool 630 is formed with a steeper diverging angle as compared to fluid reservoir 632, creating an unstable fluid area within fill pool 630. As discussed herein, this steeper diverging angle avoids loss of fluid to fill hole 608 from circulation path 634 and conical bearing 624.

Other features and advantages of this invention will be apparent to a person of skill in the art who studies this disclosure. For example, more than one fill hole, fluid reservoir and respective fill pool may be employed for a given fluid bearing. Further, the capillary seal discussed herein may be formed as an axial capillary seal, a radial capillary seal, and a combination thereof. Thus, exemplary embodiments, modifications and variations may be made to the disclosed embodiments while remaining within the spirit and scope of the invention as defined by the appended claims.

We claim:

1. A capillary seal comprising a shield affixed to and defining a channel with a stationary component, wherein:
   the stationary component defines a bore in which a rotatable component is supported for rotation relative to the stationary component, adjacent surfaces of the rotatable component and the stationary component defining a bearing gap having fluid there between;
   at least a portion of the channel is in fluid communication with the bearing gap fluid;
   the shield extends generally radially toward the rotatable component defining an annulus separating the shield and an outer surface of the rotatable component;
   the shield defines a fill hole for filling fluid and passing air through the shield; and
   the stationary component includes a fill pool situated adjacent to the fill hole, the fill pool forming a diverging angle with the shield.

2. The capillary seal as in claim 1, wherein:
   at least one of the adjacent surfaces of the shield and the stationary component axially diverge with increasing distance from the rotatable component; and
   the surface of the fill pool diverges from the shield at an angle greater than the adjacent diverging surfaces of the shield and the stationary component for creating an unstable area for any fluid in the fill pool, wherein the fill pool is one of conical or spherical in shape.

3. The capillary seal as in claim 2, wherein the angle of divergence of the adjacent surfaces of the shield and the stationary component is about 2 degrees, and the angle of divergence of the fill pool from the shield is about 30 degrees.

4. The capillary seal as in claim 2, further comprising:
   a first fluid meniscus formed within the annulus; and
   a second fluid meniscus formed within the channel defining a fluid reservoir arched at least partially about a periphery of the fill pool, and defining an air plenum situated apart from the arch, wherein the steeper divergence angle of the fill pool creates a force gradient to pull any fluid from the fill pool to the second fluid meniscus.

5. The capillary seal as in claim 4, wherein the fluid is circulated through the bearing gap and through a portion of the fluid reservoir, air being expelled to the air plenum and through the fill hole, and further comprising pumping grooves formed on at least one of adjacent surfaces of the rotatable component and the stationary component.

6. The capillary seal as in claim 2, further comprising a third fluid meniscus formed within the fill pool during one of fluid filling through the fill hole or during a shock event, wherein the divergence angle of the fill pool creates a force gradient to pull the third fluid meniscus from the fill pool.

7. The capillary seal as in claim 1, wherein the rotatable component is one of a shaft or a conical shaft, and the stationary component is a sleeve.

8. The capillary seal as in claim 1, wherein the shield and channel surfaces further extend generally axially at a position distal from the rotatable component.

9. The capillary seal as in claim 1, wherein the annulus radial width is between 0.015 mm and 0.03 mm, the axial width of the channel proximal to the rotatable component is about 0.08 mm, and the axial width of the channel distal from the rotatable component is about 0.1 mm.

10. A fluid dynamic bearing system comprising a sleeve defining a bore in which a shaft is supported for rotation relative to the sleeve, adjacent surfaces of the sleeve and shaft defining a bearing gap having fluid there between, and a shield affixed to and defining a channel with the sleeve, wherein:
    at least a portion of the channel is in fluid communication with the bearing gap fluid;
    the shield extends generally radially toward the shaft defining an annulus separating the shield and an outer surface of the shaft;
    the shield defines a fill hole for filling fluid and passing air through the shield; and
    the sleeve includes a fill pool situated adjacent to the fill hole, the fill pool forming a diverging angle with the shield.

11. The fluid dynamic bearing system as in claim 10, wherein:
    at least one of the adjacent surfaces of the shield and the sleeve axially diverge with increasing distance from the shaft; and
    the surface of the fill pool diverges from the shield at an angle greater than the adjacent diverging surfaces of the shield and the sleeve for creating an unstable area for any fluid in the fill pool, wherein the fill pool is one of conical or spherical in shape.

12. The fluid dynamic bearing system as in claim 11, wherein the angle of divergence of the adjacent surfaces of the sleeve and the shield is about 2 degrees, and the angle of divergence of the fill pool from the shield is about 30 degrees.

13. The fluid dynamic bearing system as in claim 11, further comprising:

a first fluid meniscus formed within the annulus; and a second fluid meniscus formed within the channel defining a fluid reservoir arched at least partially about a periphery of the fill pool, and defining an air plenum situated apart from the arch, wherein the steeper divergence angle of the fill pool creates a force gradient to pull any fluid from the fill pool to the second fluid meniscus.

14. The fluid dynamic bearing system as in claim 13, wherein the fluid is circulated through the bearing gap and through a portion of the fluid reservoir, air being expelled to the air plenum and through the fill hole, and further comprising pumping grooves formed on at least one of adjacent surfaces of the shaft and the sleeve.

15. The fluid dynamic bearing system as in claim 11, further comprising a third fluid meniscus formed within the fill pool during one of fluid filling through the fill hole or during a shock event, wherein the divergence angle of the fill pool creates a force gradient to pull the third fluid meniscus from the fill pool.

16. The fluid dynamic bearing system as in claim 10, wherein the shaft is a conical shaft.

17. The fluid dynamic bearing system as in claim 10, wherein the shield and channel surfaces further extend generally axially at a position distal from the shaft.

18. The fluid dynamic bearing system as in claim 10, wherein the annulus radial width is between 0.015 mm and 0.03 mm, the axial width of the channel proximal to the shaft is about 0.08 mm, and the axial width of the channel distal from the shaft is about 0.1 mm.

* * * * *

UNITED STATES PATENT AND TRADEMARK OFFICE
CERTIFICATE OF CORRECTION

| | | |
|---|---|---|
| PATENT NO. | : 7,056,026 B2 | Page 1 of 1 |
| APPLICATION NO. | : 10/686437 | |
| DATED | : June 6, 2006 | |
| INVENTOR(S) | : Alan Lyndon Grantz et al. | |

It is certified that error appears in the above-identified patent and that said Letters Patent is hereby corrected as shown below:

column 6, line 38, cancel the text beginning with " Annulus 322 is defined by" to and ending with "narrow annulus gap." in column 6, line 50.

Column 6, line 46 states "first capillary 340 331" when it should properly state -- first capillary 331 --.

Signed and Sealed this

Fifteenth Day of August, 2006

JON W. DUDAS
*Director of the United States Patent and Trademark Office*